United States Patent [19]

Morita et al.

[11] Patent Number: 4,573,723

[45] Date of Patent: Mar. 4, 1986

[54] SYSTEM INCLUDING BI-DIRECTIONAL DRIVE MECHANISM

[75] Inventors: Yoshiyuki Morita, Kariya; Hiroshi Nakamura, Nishio, both of Japan

[73] Assignee: Nippondenso Co., Ltd., Kariya, Japan

[21] Appl. No.: 639,430

[22] Filed: Aug. 10, 1984

[30] Foreign Application Priority Data

Nov. 26, 1983 [JP] Japan ............................... 58-222854

[51] Int. Cl.[4] ........................ E05B 3/00; E05B 47/00; F16H 3/34

[52] U.S. Cl. .................................. 292/336.3; 70/279; 74/354; 74/626; 74/773; 74/802; 185/40 R; 464/77

[58] Field of Search ..................... 292/201, 144, 336.3; 70/279; 464/77, 160; 185/40 R; 74/626, 773, 802, 354

[56] References Cited

U.S. PATENT DOCUMENTS

| | | | |
|---|---|---|---|
| 2,761,331 | 9/1956 | Buescher | 464/77 X |
| 2,896,873 | 7/1959 | Mageoch | 74/354 X |
| 3,757,472 | 9/1973 | Rogakos . | |
| 3,984,998 | 10/1976 | Rogakos et al. | 464/77 |
| 4,093,289 | 6/1978 | Inabayashi et al. | 292/336.3 |
| 4,154,144 | 5/1979 | Lyman | 74/354 X |
| 4,272,112 | 6/1981 | Schlick et al. | 292/201 |
| 4,311,331 | 1/1982 | Lutz | 292/336.3 |
| 4,502,718 | 3/1985 | Sasaki et al. | 292/336.3 |
| 4,520,914 | 6/1985 | Kagiyama et al. | 292/201 X |

FOREIGN PATENT DOCUMENTS 58-30473 6/1983 Japan .

*Primary Examiner*—Robert L. Wolfe

*Assistant Examiner*—Russell W. Illich

*Attorney, Agent, or Firm*—Cushman, Darby & Cushman

[57] ABSTRACT

A door lock system for an automotive door, which includes a door lock driving device for mechanically locking or unlocking a door lock. The door lock can be, however, manually operated with a small force, because the door lock is operatively disconnected from an electric motor of the door lock driving device. The door lock driving device has a reversible electric motor, a sun gear fixed to an output shaft of the electric motor, a pair of swing levers rotatably supported by the output shaft, a planetary gear rotatably supported by the swing levers and engaged with the sun gear, and wave washers interposed between the swing levers and side surfaces of the planetary gear, so that when the electric motor is rotated, the planetary gear is rotated around the output shaft of the electric motor. The door lock driving device further includes a driven gear and a driven shaft which are operatively connected with each other by means of a torsion bar, so that a rotational force of the driven gear is transmitted to the driven shaft by twisting the torsion bar. When the planetary gear is brought into engagement with the drive gear, the rotational force of the electric motor is transmitted to the driven shaft through the sun gear, the planetary gear, the driven gear and the torsion bar. When the rotation of the electric motor is stopped, the driven gear is rotated in a reverse direction by the spring back action of the torsion bar, so that the planetary gear is brought out of engagement with the driven gear to operatively disconnect the driven shaft from the electric motor.

7 Claims, 10 Drawing Figures

SYSTEM INCLUDING BI-DIRECTIONAL DRIVE MECHANISM

BACKGROUND OF INVENTION

1. Field of Invention

The present invention relates to a system including a bi-directional drive mechanism, which permits a power transmission from a driving side to a driven side in a bi-direction but prevents a power transmission from the driven side to the driving side.

More particularly, the present invention relates to a door lock system for an automotive vehicle, which includes a clutch so that when a door lock is manually operated, door lock is by means of the clutch operatively disconnected from a driving device having an electric motor, whereby the door lock can be operated with a small force.

2. Brief Description of Prior Art

In a conventional door lock system, it is known that a clutch mechanism is employed in a door lock driving device so that a door lock can be manually operated with a small force.

For example, in a conventional system of this kind disclosed in Japanese Patent Publication No. 58-30473, a swing lever is rotatably supported by a driving shaft carrying a driving gear thereon, an operation gear is rotatably supported by the swing lever and engaged with the driving gear, and a spring washer is interposed between the swing lever and the operation gear for applying a frictional force when the operation gear rotates around its own axis. In this prior art, there are further provided an internal gear which is brought into engagement with the operation gear when the operation gear rotates around the driving shaft and an expansion coil connected to the swing lever for driving the operation gear to a neutral position where the operation gear and the internal gear are out of engagement with each other.

The above explained prior art door lock device has, however, the following disadvantage. Since the swing lever is held at its neutral position by the spring force of the expansion spring, the frictional force applied to the operation gear by the spring washer should be large enough to overcome the spring force of the expansion spring so as to rotate the swing lever around the driving shaft and to bring the operation gear into engagement with the internal gear. Accordingly, a large amount of torque loss appears at the operation gear and a larger rotational force is required to drive the operation gear, which makes inevitably an electric motor larger in its size and a larger amount of power consumption can not be avoided.

SUMMARY OF INVENTION

It is, therefore, an object of the present invention to overcome the above disadvantage and to provide an improved door lock system for an automotive vehicle, according to which an electric motor can be made smaller in size and the motor can be operated with less power consumption.

According to one aspect of the present invention, the door lock system for an automotive vehicle comprises:

a reversible electric motor housed in and supported by a housing;

a sun gear fixed to an output shaft of the electric motor;

a swing lever rotatably supported by the output shaft at its one end;

a planetary gear rotatably supported by the swing lever at its other end, the planetary gear being engaged with the sun gear;

a wave washer provided between the swing lever and the planetary gear for applying a frictional force to the planetary gear, so that when the output shaft of the electric motor is rotated, the swing lever and the planetary gear rotate around the output shaft;

a driven gear rotatably supported by the housing and arranged on the same plane as the planetary gear at such a position where the driven gear is out of engagement with the sun gear but can be brought into and out of engagement with the planetary gear when the planetary gear rotates around the output shaft of the electric motor;

a driven shaft rotatably supported by the housing and coaxially arranged with the driven gear;

a torsion bar provided between the driven gear and the driven shaft for storing a restoring energy, so that a rotational force is transmitted to the driven shaft when a predetermined amount of the restoring energy is stored in the torsion bar;

a pinion formed on the driven shaft;

a sector gear rotatably supported by the housing and being engaged with the pinion; and a lever connected between the sector gear and the door lock device for transmitting a driving force from the sector gear to a door lock device, whereby when the electric motor is rotated, the planetary gear is brought into engagement with the driven gear to rotate the same in one direction, the restoring energy is stored in the torsion bar and finally the sector gear is rotated to drive the door lock device from an unlocked condition to a locked condition or from the locked condition to the unlocked condition, and when the rotation of the electric motor is stopped, the driven gear is driven to rotate in the other direction by the restoring energy to bring the planetary gear out of engagement with the driven gear, so that the door lock device can be manually operated with a small force.

BRIEF DESCRIPTION OF DRAWINGS

FIGS. 8 to 10 show a modification of a driven gear and a driven shaft, wherein FIG. 8 is a sectional view taken along a line VIII—VIII in FIG. 9, FIG. 9 is a sectional view taken along a line IX—IX in FIG. 8, and FIG. 10 is a perspective disassembled view of the modified driven gear and shaft.

DETAILED DESCRIPTION OF PREFERRED EMBODIMENTS

Figure 1:
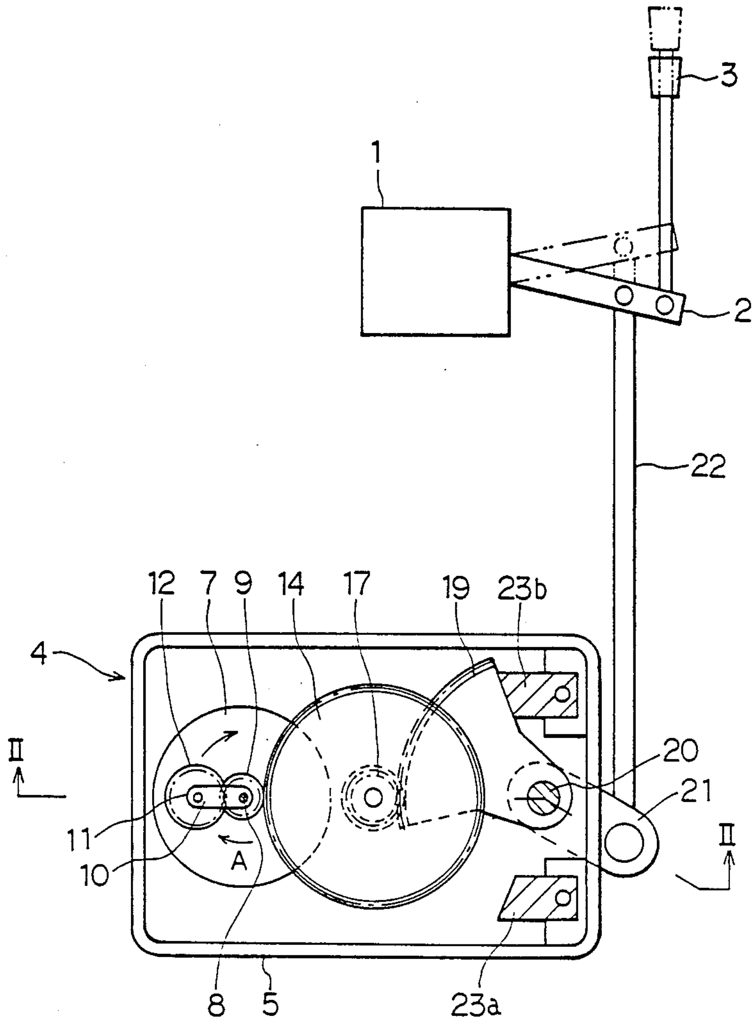
FIG. 1 is a constructional view showing a door lock system according to a first embodiment of the present invention.
Figure 2:
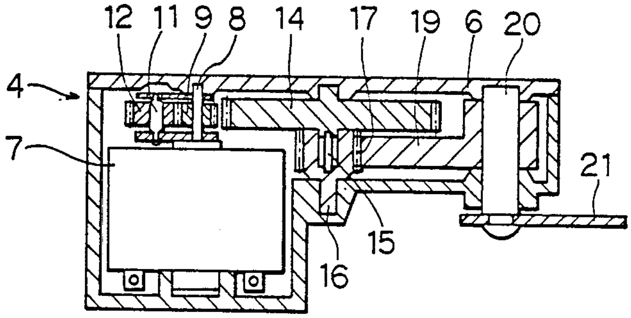
FIG. 2 is a sectional view taken along a line II—II in FIG. 1.
Figure 3:
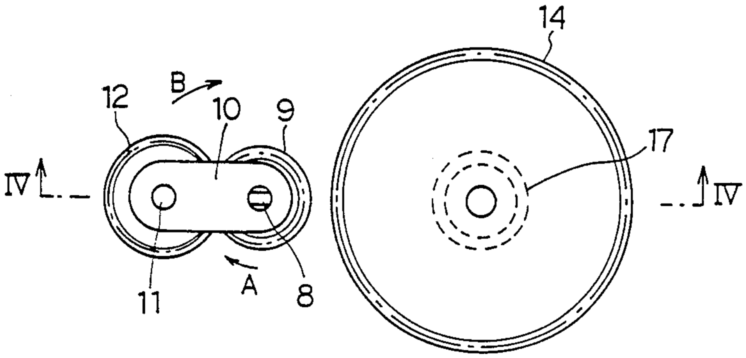
FIG. 3 is an expanded plan view showing principal portions of the embodiment.
Figure 4:
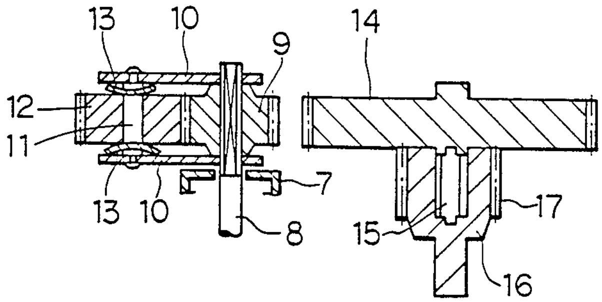
FIG. 4 is a sectional view taken along a line IV—IV in FIG. 3, FIGS. 5 and 6 are plan views respectively showing operational modes.

The present invention will now be explained with reference to the attached drawings, wherein the system including a drive mechanism of the present invention is applied to a door lock system for an automotive vehicle.

The first embodiment of the invention is shown in FIGS. 1 to 7, wherein numeral 1 designates a door lock device installed in a door of the automotive vehicle, and having an operating lever 2 swingably attached to the door lock device 1 and a knob 3 connected to the operating lever 2. When the operating lever 2 is moved to a position shown by a solid line in FIG. 1, the door lock device 1 is locked, and when the lever 2 is moved to a position shown by an imaginary line in FIG. 1, the door lock device 1 is unlocked. The lever 2 can be operated manually by pushing down or pulling up the knob 3 or mechanically by means of a driving device according to the invention, which will be explained hereinafter.

Numeral 4 designates the driving device for operating the door lock device 1 through a link lever 22. Numeral 5 designates a casing and numeral 6 designates a cover for housing therein a reversible electric motor 7. An output shaft 8 of the motor 7 acts as a driving shaft to which a sun gear 9 is firmly fixed. A pair of swing levers 10 are supported by the driving shaft 8 at both sides of the sun gear 9. At forward ends of the swing levers 10, a supporting pin 11 is firmly secured to the levers 10 for rotatably supporting a planetary gear 12 which is engaged with the sun gear 9. A pair of resistive elements 13, wave washers in this embodiment, are interposed between the swing levers 10 and side surfaces of the planetary gear 12 for applying a frictional force to the planetary gear 12 with respect to the swing levers 10, so that when a rotational force transmitted from the sun gear 9 to the planetary gear 12 exceeds the frictional force between the planetary gear 12 and the swing levers 10, the planetary gear 12 can rotate around the supporting pin 11.

A driven gear 14 is rotatably supported by and housed in the casing 5 and the cover 6 and is arranged on the same plane as the sun gear 9 and the planetary gear 12 at such a position where the driven gear 14 is spaced from the sun gear 9 but is brought into engagement with the planetary gear 12 when it rotates around the sun gear 9. A driven shaft 16, integrally formed with a pinion 17, is rotatably supported by the casing 5 and coaxially arranged with the driven gear 14. The driven shaft 16 is connected to the driven gear 14 by means of an elastic element 15, a torsion bar in this embodiment, so that a rotating force is transmitted from the driven gear 14 to the driven shaft 16 through the torsion bar 15.

A sector gear 19 is swingably housed in the casing 5 and the cover 6 and is engaged with the pinion 17. A pin 20, to which the sector gear 19 is firmly secured, is rotatably supported by the casing 5 and the cover 6 and one end thereof is projecting outwardly from the casing 5.

A drive lever 21 is firmly connected at its one end to the projecting end of the pin 20, while the other end of the drive lever 21 is connected to the link lever 22.

A pair of stoppers 23*a* and 23*b* are provided in the casing 5 for limiting a swinging movement of the sector gear 19. The stoppers may be made of an elastic material such as rubber, sponge or the like.

An operation of the above described first embodiment will be next explained. The operating lever position shown by the solid line in FIG. 1 is a locked condition for the door lock device 1. When the electric motor 7 is rotated in a direction indicated by an arrow A in FIG. 3 for driving the lever 2 to an unlocked position shown by the imaginary line in FIG. 1, the swing levers 10 are swung in a direction indicated by an arrow B, since the resistive frictional force is applied to the planetary gear 12 by means of the wave washers 13 for preventing the planetary gear 12 from rotating around the supporting pin 11 with a rotational force below a predetermined level.

Figure 5:
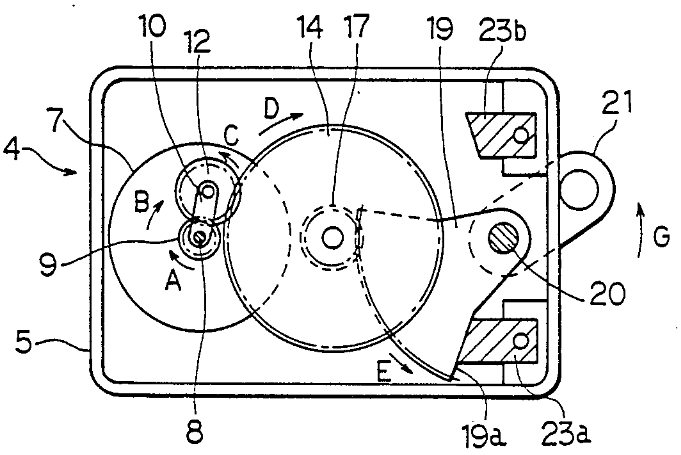

The planetary gear 12, therefore, rotates around the driving shaft 8 in the direction of the arrow B and is brought into engagement with the driven gear 14 as shown in FIG. 5. When the planetary gear 12 is engaged with the driven gear 14, the planetary gear 12 is rotated no longer around the driving shaft 8 but begins to rotate around the supporting pin 11 in a direction indicated by an arrow C in FIG. 5, so that the driven gear is rotated in a direction indicated by an arrow D in FIG. 5.

Figure 7:
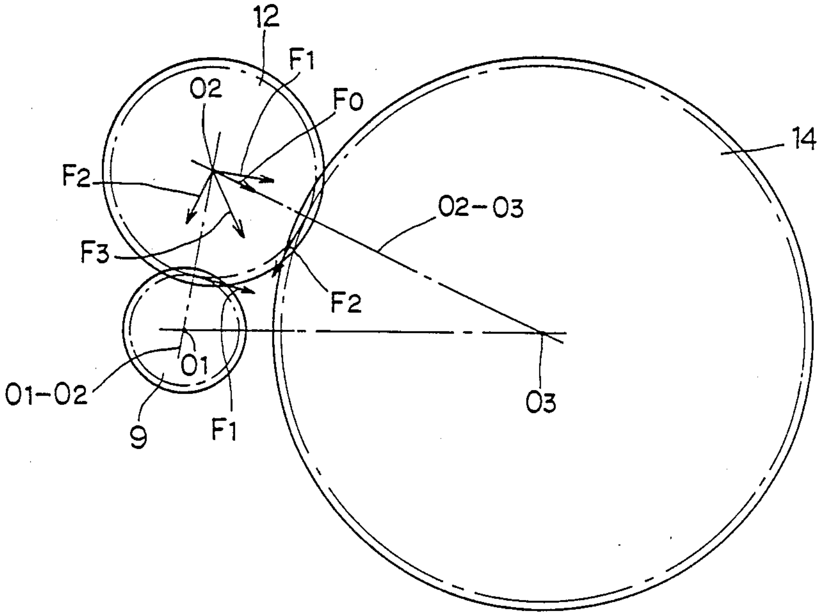
FIG. 7 is an explanatory view showing respective forces applied to a planetary gear.

Under the above condition, a force F1 indicated in FIG. 7 is applied to the planetary gear 12 since the frictional force is applied to the planetary gear 12 and its rotation is thereby restricted. A direction of the force F1 is perpendicular to a line $O_1$–$O_2$ connecting both centers $O_1$ and $O_2$ of the sun gear 9 and the planetary gear 12, and its degree corresponds to the degree of the frictional force applied to the planetary gear by the wave washers. Further applied to the planetary gear 12 is a force F2, a direction of which is perpendicular to a line $O_2$–$O_3$ connecting both centers $O_2$ and $O_3$ of the planetary gear 12 and the driven gear 14 and a degree of which corresponds to a degree of a load applied to the driven gear 14. A composite force F3 of the forces F1 and F2 is finally applied to the planetary gear 12 and a component F0 directed towards the center $O_3$ of the driven gear 14 prevents the planetary gear 12 from being brought out of engagement with the driven gear 14.

As above, the driven gear 14 is rotated in the direction of the arrow D in FIG. 5, while twisting the torsion bar 15. When the twisting of the torsion bar 15 exceeds a predetermined value, the driven shaft 16 begins to rotate together with the driven gear 14. The rotation of the driven shaft 16 is transmitted to the sector gear 19 through the pinion 17, and the sector gear 19 is rotated in a direction indicated by an arrow E in FIG. 5 while rotating the drive lever 21 in a direction indicated by an arrow G in FIG. 5. As a consequence, the operating lever 2 is moved to the unlocked position shown by the imaginary line in FIG. 1 so as to unlock the door lock device 1.

When one side surface of the sector gear 19 abuts upon the stopper 23*a*, current supply to the electric motor 7 is stopped. When the motor operation is stopped, the force F0 is no longer applied to the planetary gear 12 and the driven gear 14 begins to rotate in a direction opposite to the arrow D by an energy stored in the torsion bar 15. The planetary gear 12 is then rotated in a direction opposite to the arrow C and the sun gear 9 is rotated in a direction opposite to the arrow A. When the energy stored in the torsion bar 15 is exhausted, the rotation of the driven gear 14 is stopped, however the sun gear 9 is going to be further rotated to some extent in the opposite direction due to the moment of inertia of the sun gear 9 as well as an armature of the electric motor 7 connected to the sun gear 9. This small amount of rotation of the sun gear in the opposite direction moves the pair of swing levers 10 in a direction opposite to the arrow B with the result that the planetary gear 12 is brought out of engagement with the driven gear 14.

As explained above, since the door lock device 1 is unlocked by the driving device 4 and the planetary gear 12 is automatically brought out of engagement with the driven gear 14, when the knob 3 is manually pushed down to lock the door lock device 1, the sector gear 19 as well as the driven gear 14 is rotated through the levers 2, 22 and 21, however the planetary gear 12, the sun gear 9 and the electric motor 7 are not rotated, resulting in that the knob 3 can be pulled down by a small force.

Figure 6:
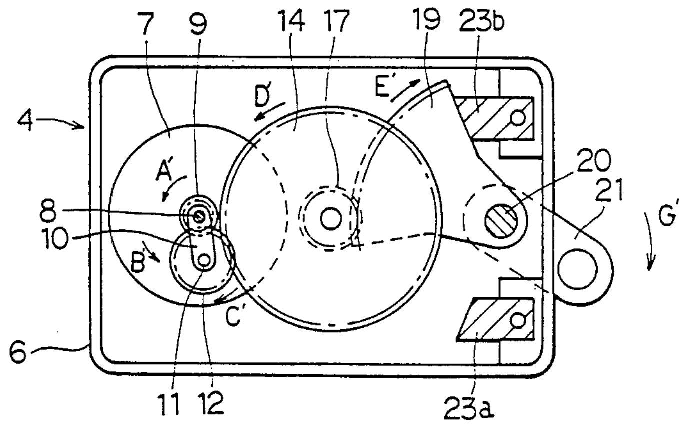

When the door lock device 1 is to be driven from the unlocked condition to the locked condition by the driving device 4 electric current is supplied to the electric motor so that it rotates in a direction indicated by A' in FIG. 6. The motor 7 is rotated in the opposite direction to that of the case explained with reference to FIG. 5 and the following operation is the same as that of FIG. 5 except directions of each elements.

As above, the door lock device 1 can be driven from the locked condition to the unlocked condition or vice versa by the manual operation or the mechanical operation with the drive device and the manual operation can be performed with the small force.

Figure 8:
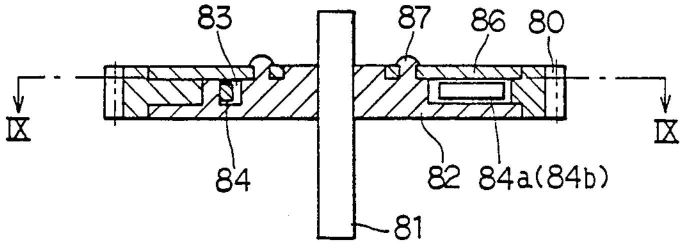
Figure 9:
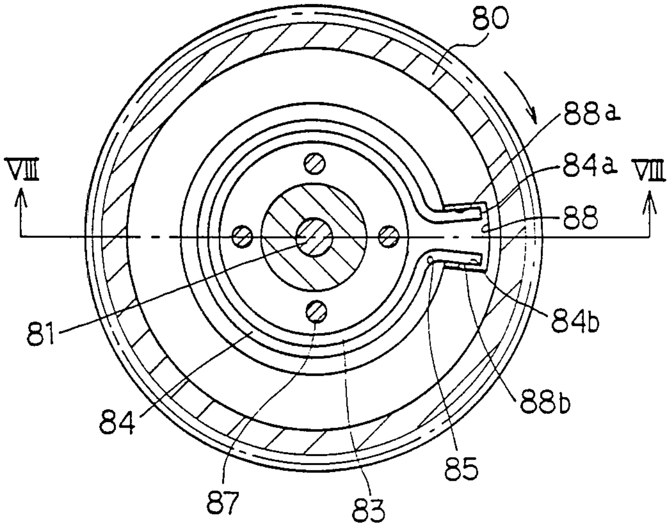
Figure 10:
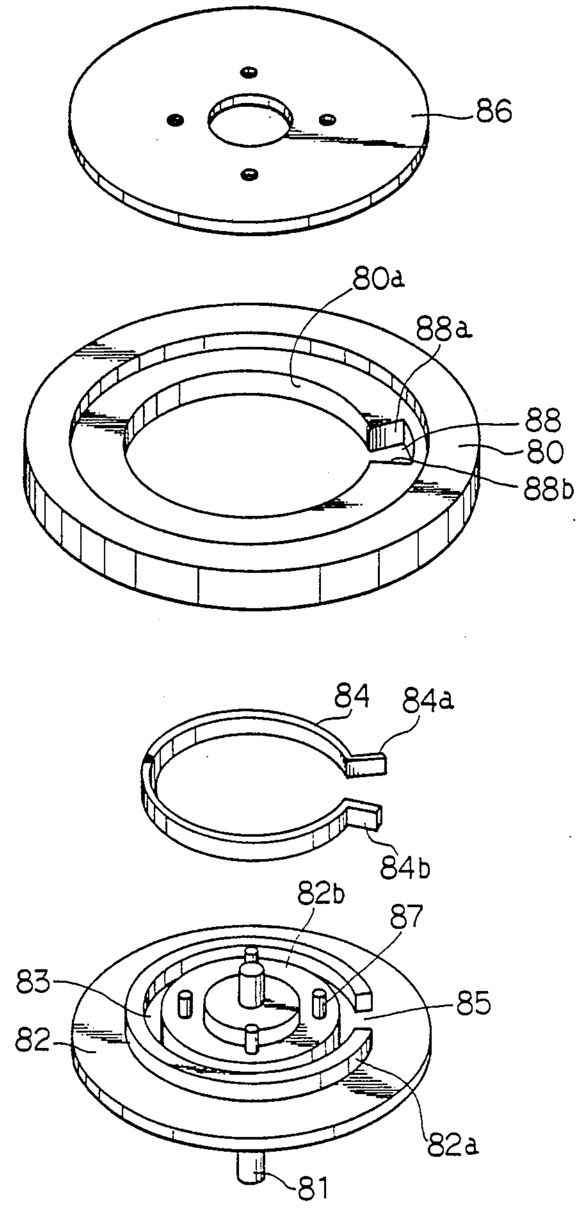

FIGS. 8 to 10 show a modified construction of the driven gear and driven shaft, wherein numeral 81 designates the driven shaft rotatably supported by the casing. Although not shown in FIGS. 8 to 10, the pinion is integrally formed on the shaft 81 or may be firmly attached thereto. A disk 82 is secured to the shaft 81 and integrally formed with a C-shaped projection *82a* and a cylindrical projection *82b* to form an annular groove 83 and a notch portion 85 on one surface of the disk 82. A plurality of pins 87 are formed on the cylindrical projection *82b*. A ring-shaped driven gear 80 has an opening *80a* into which the C-shaped projection *82a* is inserted so that the gear 80 may be rotated relative to the disk 82. The gear 80 is formed with a stopper groove 88, an Ω-shaped spring 84 is put into the annular groove 83 and a pair of leg portions *84a* and *84b* of the spring are extending through the notch portion 85 into the stopper groove 88. One side surface of each leg portion is engaged with each stopper surface *88a*, *88b* of the groove 88 due to an expanding spring force of the spring 84. Numeral 86 designates a cover fixed to the cylindrical projection *82b* of the disk 82.

When the driven gear 80 is engaged with the planetary gear and is rotated in a direction indicated by an arrow in FIG. 9, the stopper surface *88a* pushes the leg portion *84a* of the spring 84 towards the other leg portion *84b*, so that the spring 84 is compressed to store a restoring energy therein. When the motor operation is stopped, the spring 84 is going to expand, to thereby rotate the driven gear 80 in a direction opposite to the arrow so that the planetary gear is brought out of engagement with the driven gear 80 as in the first embodiment.

The present invention may not be limited to the above-described embodiments and any other modifications can be easily made without departing from a spirit of the present invention.

For example, the present invention may be applied to a driving system for driving windows of an automotive vehicle.

The sun gear, the planetary gear and other gears can be replaced by friction gears.

The wave washers can be replaced by coil springs or interposed between the swing levers and the sun gear.

What is claimed is:

1. A door lock system for an automotive vehicle comprising:

a door lock device (1) installed in a door of an automotive vehicle;

a knob (3) installed in said door and operatively connected to said door lock device for manually driving said door lock device from an unlocked condition to a locked condition or from the locked condition to the unlocked condition; and a drive device (4) operatively connected to said door lock device for mechanically driving the door lock device;

wherein said drive device comprises:

a housing (4, 5) installed in said door;

a reversible electric motor (7) housed in and supported by said housing;

sun gear means (9) fixed to an output shaft (8) of said electric motor;

swing lever means (10) rotatably supported by said output shaft at its one end;

planetary gear means (12) rotatably supported by said swing lever means at its other end, said planetary gear means being engaged with said sun gear means;

resistive element means (13) provided between said swing lever means and one of said sun gear means and said planetary gear means for applying a frictional force to said one of said sun gear means and planetary gear means, so that when said output shaft of said electric motor is rotated, said swing lever means and said planetary gear means rotate around said output shaft;

driven gear means (14, 80) rotatably supported by said housing and arranged on the same plane as said planetary gear means at such a position where said driven gear means is out of engagement with said sun gear means but can be brought into and out of engagement with said planetary gear means when said planetary gear means rotates around said output shaft of said electric motor;

a driven shaft (16, 81) rotatably supported by said housing and coaxially arranged with said driven gear means;

elastic element means (15,84) provided between said driven gear means and said driven shaft for storing a restoring energy, so that a rotational force is transmitted to said driven shaft when a predetermined amount of said restoring energy is stored in said elastic element means;

pinion means (17) formed on said driven shaft;

driving gear means (19) rotatably supported by said housing and being engaged with said pinion means; and lever means (21, 22) connected between said driving gear means and said door lock device for transmitting a driving force from said driving gear means to said door lock device, whereby when said electric motor is rotated, said planetary gear means is brought into engagement with said driven gear means to rotate the same in one direction, said restoring energy is stored in said elastic element means and finally said driving gear means is rotated to drive said door lock device from the unlocked condition to the locked condition or from the locked condition to the unlocked condition, and when the rotation of said electric motor is stopped, said driven gear means is driven to rotate in the other direction by said restoring energy to bring said planetary gear means out of engagement with said driven gear means, so that said door lock device can be manually operated with a small force.

2. A door lock system as set forth in claim 1, wherein said resistive element means comprises a wave washer interposed between said swing lever means and one side surface of said planetary gear means.

3. A door lock system as set forth in claim 1, wherein said elastic element means comprises a torsion bar connected at its one end to said driven gear means and at its other end to said driven shaft.

4. A door lock system as set forth in claim 1, wherein said driving gear means comprises a sector gear.

5. A door lock system as set forth in claim 4, further comprising:

a pair of stoppers provided in said housing for limiting a rotational movement of said sector gear.

6. A door lock system as set forth in claim 1, wherein said driven shaft comprises;

a disk (82); and a C-shaped projection (**82*a*) having a notch (85) formed on said disk to form an annular groove (83**) at an inside of said C-shaped projection;

said driven gear means comprises a ring-shaped gear (80) rotatable around said C-shaped projection, said ring-shaped gear having a stopper groove (88), and said elastic element means comprises an Ω-shaped spring (84) disposed in said annular groove, said spring having a pair of legs (**84*a*, 84*b***) extending through said notch into said stopper groove.

7. A driving apparatus for an automotive equipment comprising:

a housing (4, 5);

a reversible electric motor (7) housed in and supported by said housing;

sun gear means (9) fixed to an output shaft (8) of said electric motor;

swing lever means (10) rotatably supported by said output shaft at its one end;

planetary gear means (12) rotatably supported by said swing lever means at its other end, said planetary gear means being rotatable around its own axis and engaged with said sun gear means;

resistive element means (13) provided between said swing lever means and one of said sun gear means and said planetary gear means for applying a frictional force to said one of said sun gear means and said planetary gear means, so that when said output shaft is rotated, said planetary gear means rotates around said output shaft;

driven gear means (14, 80) rotatably supported by said housing and arranged on the same plane as said planetary gear means at such a position where said driven gear means is out of engagement with said sun gear means but can be brought into and out of engagement with said planetary gear means when said planetary gear means is rotated around said output shaft by said electric motor;

a driven shaft (16, 81) rotatably supported by said housing and coaxially arranged with said driven gear means; and elastic element means (15, 84) provided between said driven gear means and said driven shaft for storing a restoring energy, so that a rotational force is transmitted to said driven shaft when a predetermined amount of said restoring energy is stored in said elastic element means, whereby when said electric motor is rotated in one of directions, said planetary gear means is rotated around said output shaft until said planetary gear means is brought into engagement with said driven gear means, when said planetary gear means and driven gear means are engaged with each other, said driven gear means is rotated in one direction to at first store said restoring energy and then rotate said driven shaft, and when the rotation of said electric motor is stopped, said driven gear means is rotated in the opposite direction by said restoring energy to bring said planetary gear means out of engagement with said driven gear means.

* * * * *